United States Patent
Ahn et al.

(10) Patent No.: US 10,355,309 B2
(45) Date of Patent: Jul. 16, 2019

(54) GEL POLYMER ELECTROLYTE AND ELECTROCHEMICAL DEVICE INCLUDING THE SAME

(71) Applicant: LG Chem, Ltd., Seoul (KR)

(72) Inventors: Kyoung Ho Ahn, Daejeon (KR); Jeong Woo Oh, Daejeon (KR); Yi Jin Jung, Daejeon (KR); Doo Kyung Yang, Daejeon (KR); Min Jung Kim, Daejeon (KR)

(73) Assignee: LG Chem, Ltd. (KR)

( * ) Notice: Subject to any disclaimer, the term of this patent is extended or adjusted under 35 U.S.C. 154(b) by 304 days.

(21) Appl. No.: 14/423,592

(22) PCT Filed: Oct. 31, 2014

(86) PCT No.: PCT/KR2014/010360
§ 371 (c)(1),
(2) Date: Feb. 24, 2015

(87) PCT Pub. No.: WO2015/065101
PCT Pub. Date: May 7, 2015

(65) Prior Publication Data
US 2016/0028111 A1    Jan. 28, 2016

(30) Foreign Application Priority Data

Oct. 31, 2013 (KR) .......... 10-2013-0131474
Oct. 31, 2014 (KR) .......... 10-2014-0150127

(51) Int. Cl.
*H01M 10/0565* (2010.01)
*H01M 10/052* (2010.01)
(Continued)

(52) U.S. Cl.
CPC ..... *H01M 10/0565* (2013.01); *H01M 10/052* (2013.01); *H01M 10/4235* (2013.01);
(Continued)

(58) Field of Classification Search
CPC ......... H01M 10/0565; H01M 10/0567; H01M 10/4235; H01M 10/052; H01M 2220/30; H01M 2300/0085; H01M 2300/0028
See application file for complete search history.

(56) References Cited

U.S. PATENT DOCUMENTS 5,972,539 A    10/1999 Hasegawa et al.
6,939,647 B1    9/2005 Jow et al.
(Continued)

FOREIGN PATENT DOCUMENTS

CN    101195670 A    6/2008
EP    2442397 A1    4/2012
(Continued)

OTHER PUBLICATIONS

International Search Report for Application No. PCT/KR2014/010360 dated Feb. 4, 2015.
(Continued)

*Primary Examiner* — Ula C Ruddock
*Assistant Examiner* — Matthew W Van Oudenaren
(74) *Attorney, Agent, or Firm* — Lerner, David, Littenberg, Krumholz & Mentlik, LLP

(57) ABSTRACT

The present invention provides a gel polymer electrolyte obtained by polymerizing and gelling a composition for a gel polymer including an organic solvent, an electrolyte salt and a first polymerizable monomer, wherein the gel polymer electrolyte further comprises a compound represented by the following Formula 1 as a first additive:

[Formula 1]

(Continued)

(a)    (b)    (c)    (d)

where $R_1$ to $R_3$ are independently hydrogen, an alkyl group having 1 to 5 carbon atoms, an aryl group having 5 to 7 carbon atoms, or a fluorine substituted alkyl group having 1 to 5 carbon atoms, or at least two substituents selected from $R_1$ to $R_3$ are coupled or connected to each other to form a cycle group having a ring atom composed of 2 to 6 carbon atoms or a heterocyclic group having a ring atom composed of 2 to 8 carbon atoms and 1 to 3 oxygen hetero atoms.

20 Claims, 2 Drawing Sheets (51) Int. Cl.
*H01M 10/42* (2006.01)
*H01M 10/0567* (2010.01)

(52) U.S. Cl.
CPC .... *H01M 10/0567* (2013.01); *H01M 2220/30* (2013.01); *H01M 2300/0028* (2013.01); *H01M 2300/0085* (2013.01)

(56) References Cited

U.S. PATENT DOCUMENTS

| | | | |
|---|---|---|---|
| 8,137,849 | B2 | 3/2012 | Kang et al. |
| 2005/0019668 | A1* | 1/2005 | Yamamoto ............. C08J 5/2231 |
| | | | 429/317 |
| 2005/0277027 | A1* | 12/2005 | Kim ................. H01M 10/0525 |
| | | | 429/326 |
| 2007/0224515 | A1* | 9/2007 | Xu ........................ H01G 9/038 |
| | | | 429/326 |
| 2008/0076026 | A1 | 3/2008 | Ryu et al. |
| 2009/0317723 | A1* | 12/2009 | Yu ..................... H01M 10/0565 |
| | | | 429/302 |
| 2010/0003604 | A1* | 1/2010 | Kang ..................... C07F 9/091 |
| | | | 429/314 |
| 2011/0183213 | A1 | 7/2011 | Inoue et al. |
| 2011/0256456 | A1* | 10/2011 | Jeon ................. H01M 10/0565 |
| | | | 429/303 |
| 2012/0141878 | A1* | 6/2012 | Ohashi ............. H01M 10/0567 |
| | | | 429/300 |
| 2015/0079480 | A1 | 3/2015 | Ahn et al. |
| 2016/0028113 | A1 | 1/2016 | Jeon et al. |

FOREIGN PATENT DOCUMENTS

| | | |
|---|---|---|
| JP | H10116515 A | 5/1998 |
| JP | H1166948 A | 3/1999 |
| JP | 2006024440 A | 1/2006 |
| JP | 2008084838 A | 4/2008 |
| JP | 2009544794 A | 12/2009 |
| JP | 2010514134 A | 4/2010 |
| JP | 2012190700 A | 10/2012 |
| KR | 100744835 B1 | 8/2007 |
| KR | 20070101482 A | 10/2007 |
| KR | 1020070101482 * | 10/2007 |
| KR | 20080027503 A | 3/2008 |
| KR | 20080058197 A | 6/2008 |
| KR | 20080103459 A | 11/2008 |
| KR | 1020080103459 * | 11/2008 |
| WO | 2010143658 A1 | 12/2010 |
| WO | WO2010143658 * | 12/2010 |
| WO | 2014010936 A1 | 1/2014 |

OTHER PUBLICATIONS

Extended Search Report from European Application No. 14833562.3, dated Dec. 2, 2016.

* cited by examiner

GEL POLYMER ELECTROLYTE AND ELECTROCHEMICAL DEVICE INCLUDING THE SAME

CROSS-REFERENCE TO RELATED APPLICATIONS

The present application is a national phase entry under 35 U.S.C. § 371 of International Application No. PCT/KR2014/010360 filed Oct. 31, 2014, which claims priority from Korean application no. 10-2013-0131474 filed Oct. 31, 2013 and Korean application no 10-2014-0150127 filed Oct. 31, 2014, all of which are hereby incorporated herein by reference.

TECHNICAL FIELD

The present invention relates to a gel polymer electrolyte including an additive capable of imparting forming effects of the gel polymer electrolyte in an air atmosphere and the reinforcing function of flame retardancy, and an electrochemical device including the gel polymer electrolyte.

BACKGROUND ART

As an applying field of energy storage technique is enlarged to a cellular phone, a camcorder, a laptop PC and an electrical vehicle, efforts on studying and developing batteries have been increasingly embodied.

In consideration of this aspect, an electrochemical device receives the most attention. Particularly, according to the trend of electric devices having small size and light weight, efforts on developing a lithium secondary battery having small size, light weight and capable of charging and discharging in high capacity have been continued.

The lithium secondary battery is composed of a cathode and an anode, which include an electrode active material that may intercalate and deintercalate lithium ions, a separator disposed therebetween and an electrolyte as a delivering medium of the lithium ions.

As the electrolyte, an electrolyte of a liquid state, particularly, an ion conductive organic liquid electrolyte obtained by dissolving a salt in a non-aqueous organic solvent has been widely used. However, with the liquid electrolyte, leakage may be generated, and ignition and explosion may be induced due to the high flammability of the non-aqueous organic solvent used. In addition, with the liquid electrolyte, a carbonate organic solvent may be decomposed during charging and discharging a lithium secondary battery, or a side reaction with an electrode may be carried out to generate a gas in a battery. The side reaction may be further accelerated during storing at a high temperature to increase the amount of the gas generated. The gas consistently generated may induce the increase of the inner pressure of the battery, leading the modification of the battery including the expansion of the thickness of the battery. In addition, the local difference of adhesiveness may be generated on the surface of the electrode of the battery, and electrode reaction may not be carried out uniformly on the entire surface of the electrode.

Recently, a method of using a gel polymer electrolyte causing no concern of leakage, etc. has been suggested to overcome the safety problem of an electrolyte having a liquid state. The gel polymer electrolyte is manufactured by impregnating a polymer matrix formed by the polymerization reaction of a polymerizable monomer and a polymer initiator with an electrolyte including an electrolyte salt and a non-aqueous organic solvent and then, gelling.

However, since the gel polymer electrolyte also includes the non-aqueous organic solvent, defects concerning thermal safety still are mentioned. In addition, since inferior battery performance is attainable when compared to a battery using a liquid electrolyte, there are limits on commercialization.

DISCLOSURE OF THE INVENTION

Technical Problem

In order to improve the thermal safety of a gel polymer electrolyte including a non-aqueous organic solvent, a gel polymer electrolyte including a polymerizable monomer containing a flame retardant functional group and a flame retardant additive having gel polymer electrolyte forming effects and imparting flame retardant performance in an air atmosphere, is provided in the present invention.

In addition, an electrochemical device including the gel polymer electrolyte is provided in the present invention.

Technical Solution

According to an aspect of the present invention, there is provided a gel polymer electrolyte obtained by polymerizing and gelling a composition for a gel polymer including a non-aqueous organic solvent, an electrolyte salt and a first polymerizable monomer, wherein the gel polymer electrolyte further includes (a) a compound represented by the following Formula 1 as a first additive.

[Formula 1]

where $R_1$ to $R_3$ are independently hydrogen, an alkyl group having 1 to 5 carbon atoms, an aryl group having 5 to 7 carbon atoms, or a fluorine substituted alkyl group having 1 to 5 carbon atoms, or at least two substituents selected from $R_1$ to $R_3$ are coupled or connected to each other to form a cycle group having a ring atom composed of 2 to 6 carbon atoms or a heterocyclic group having a ring atom composed of 2 to 8 carbon atoms and 1 to 3 oxygen hetero atoms.

In addition, the gel polymer electrolyte may further include a (meth)acrylic acid ester compound, as a second additive.

The gel polymer electrolyte of the present invention may further include a compound represented by the following Formula 2, as a third additive.

[Formula 2]

where $R_4$ is hydrogen or an alkyl group having 1 to 5 carbon atoms, $R_5$ to $R_7$ are independently hydrogen, fluorine or $-O-CO-CH=CH_2$, and n is an integer from 1 to 5.

According to another aspect of the present invention, there is provided an electrochemical device including a cathode, an anode, a separator disposed between the cathode and the anode, and the gel polymer electrolyte.

Advantageous Effects

According to the present invention, a polymerizable monomer including a flame retardant functional group and a flame retardant additive decreasing the effects of oxygen are further added during preparing a gel polymer electrolyte, thereby improving the forming effects of the gel polymer electrolyte in an air atmosphere and securing the thermal safety of an electrochemical device including the same.

BRIEF DESCRIPTION OF THE DRAWINGS

Preferred embodiments of the invention will be illustrated with reference to the accompanying drawings. The drawings are illustrated for further understanding of the technical spirit of present invention and the above-described contents of the invention, and the present invention should not be construed as limited to the disclosure in the drawings.

BEST MODE FOR CARRYING OUT THE INVENTION

Hereinafter, the present invention will be described in more detail to assist the understanding of the present invention. It will be understood that terms or words used in the specification and claims, should not be interpreted as having a meaning that is commonly used or defined in dictionaries, but should be interpreted as having a meaning that is consistent with their meaning in the context of the present invention on the basis of the principle that the concept of the terms may be appropriately defined by the inventors for the best explanation of the invention.

A non-aqueous organic solvent used for the preparation of a gel polymer electrolyte is decomposed and burns while generating highly active radicals such as $OH^-$, $H^+$ when the temperature of an electrochemical device increases. In this case, since the radical generating reaction is an exothermic reaction, the combustion reaction of the organic solvent may be a chain reaction, and explosion and ignition of a device may be induced. Meanwhile, in the case that the gel polymer electrolyte is prepared in the presence of the air or oxygen, the reactivity of polymerizable monomers may decrease, and unreacted monomers may be present. Thus, the forming effects of the gel polymer electrolyte may be deteriorated, and battery performance may be decreased.

In an embodiment of the present invention, there is provided a gel polymer electrolyte obtained by polymerizing and gelling a composition for a gel polymer including a non-aqueous organic solvent, an electrolyte salt and a first polymerizable monomer, wherein the gel polymer electrolyte further includes a compound represented by the following Formula 1 as a first additive.

[Formula 1]

where $R_1$ to $R_3$ are independently hydrogen, an alkyl group having 1 to 5 carbon atoms, an aryl group having 5 to 7 carbon atoms, or a fluorine substituted alkyl group having 1 to 5 carbon atoms, or at least two substituents selected from $R_1$ to $R_3$ are coupled or connected to each other to form a cycle group having a ring atom composed of 2 to 6 carbon atoms or a heterocyclic group having a ring atom composed of 2 to 8 carbon atoms and 1 to 3 oxygen hetero atoms.

Meanwhile, when the radical reaction required during the preparation of the gel polymer electrolyte is performed in the presence of oxygen, a peroxide group may be stabilized through quenching by the oxygen, and the efficiency of the chain reaction is known to decrease.

In the present invention, the compound represented by Formula 1 as the first additive is a flame retardant additive component and decreases the effect of oxygen in an air atmosphere, for example, performs a reaction with an active oxygen to form a phosphate, consumes oxygen to increase conversion ratio during reaction (the reactivity of polymerizable monomers), and reinforces flame retardancy at the same time.

In this case, a typical example of the compound represented by Formula 1 as the first additive may be at least one selected from the group consisting of trimethyl phosphite, triethyl phosphite, tributyl phosphate (TBP), triphenyl phosphite, ethyl ethylene phosphate (EEP) and tris(2,2,2-trifluoroethyl)phosphite (TTFEP).

In addition, the amount of the compound represented by Formula 1 as the first additive may be from 0.01 to 10 parts by weight based on 100 parts by weight of the total amount of the gel polymer electrolyte. In the case that the amount of the compound is less than 0.01 parts by weight, the improving effect of flame retardancy may be insufficient, and the mechanical properties of the electrolyte may be deteriorated, and in the case that the amount exceeds 10 parts by weight, the ionic conductivity of the electrolyte may decrease.

In addition, the gel polymer electrolyte of the present invention may further include a second polymerizable monomer as a second additive, for example, a (meth)acrylic acid ester compound including at least two acrylate groups in the molecule to form a polymer matrix more easily, which is a basic skeleton, during preparing the gel polymer electrolyte.

Examples of the (meth)acrylic acid ester compound of the second additive may include a monomer represented by the following Formulae 3a to 3c or the oligomers thereof.

[Formula 3a]

where $R_8$, $R_9$, $R_{10}$ and $R_{13}$ are independently hydrogen, a substituted or unsubstituted alkyl group having 1 to 4 carbon atoms, $R_{11}$ and $R_{12}$ are independently hydrogen, oxygen or an alkyl group having 1 to 4 carbon atoms, where in the case that $R_{11}$ and $R_{12}$ are oxygen, a double bond is formed with a combined carbon, m is an integer from 1 to 20, and o is an integer of 0 or 1 to 3,

[Formula 3b]

where $R_{14}$ is an alkyl group having 1 to 5 carbon atoms or where $R_{18}$ is an alkylene group having 1 to 5 carbon atoms, $R_{19}$ is an alkyl group having 1 to 5 carbon atoms, an alkyl group including a hydroxyl terminal group and having 1 to 5 carbon atoms or —C—O—CO—CH=CH$_2$, and $R_{20}$ and $R_{21}$ are —$R_{22}$—O—CO—CH=CH$_2$, where $R_{22}$ is an alkylene group having 1 to 5 carbon atoms, $R_{15}$ and $R_{16}$ are an alkylene group having 1 to 10 carbon atoms or an alkylene group including at least one ether group and having 1 to 10 carbon atoms, $R_{17}$ is —C—O—($R_{24}$)$_y$—O—CO—CH=CH$_2$ or —($R_{24}$)$_y$—O—CO—CH=CH$_2$, where $R_{24}$ is an alkylene group having 1 to 5 carbon atoms, y is an integer from 0 to 5, and P is an integer from 0 to 5,

[Formula 3c]

where $R_{25}$ is an alkyl group having 1 to 5 carbon atoms, $R_{26}$ and $R_{27}$ are —O—($R_{23}$)$_y$—O—CO—CH=CH$_2$ or —($R_{26}$)$_y$—O—CO—CH=CH$_2$, where $R_{23}$ and $R_{26}$ are an alkylene group having 1 to 5 carbon atoms, and y is an integer from 0 to 5.

Particularly, typical examples of the (meth)acrylic acid ester compound as the second additive may include a single material or a mixture of at least two selected from the group consisting of ethoxylated trimethylolpropane triacrylate (ETPTA), di(trimethylolpropane)tetraacrylate, di(ethylene glycol)diacrylate (Di(EG)DA), di(ethylene glycol)dimethacrylate (Di(EG)DM), ethylene glycol dimethacrylate (EGDM), dipropylene glycol diacrylate (Di(PG)DA), dipropylene glycol dimethacrylate (Di(PG)DM), ethylene glycol divinyl ether (EGDVE), diethylene glycol divinyl ether (Di(EG)DVE), triethylene glycol dimethacrylate (Tri(EG)DM), dipentaerythritol pentaacrylate (DPentA), trimethylolpropane triacrylate (TMPTA), trimethylolpropane trimethacrylate (TMPTM), propoxylated(3)trimethylolpropane triacrylate (PO(3)TMPTA), propoxylated(6)trimethylolpropane triacrylate (PO(6)TMPTA), poly(ethylene glycol)diacrylate (PAI) and polyethylene glycol dimethacrylate. However, the present invention is not limited thereto, and a multi-acrylate may be mixed thereto.

The amount of the (meth)acrylic acid ester compound of the second additive is not specifically limited, however may be from about 0.1 to about 20 parts by weight based on 100 parts by weight of the total amount of the gel polymer electrolyte to improve the forming effects of the polymer matrix, which is the basic skeleton of the gel polymer electrolyte.

In addition, the gel polymer electrolyte of the present invention may further include a compound represented by the following Formula 2, as a third additive to additionally impart flame retardancy improving effects.

[Formula 2]

where $R_4$ is hydrogen or an alkyl group having 1 to 5 carbon atoms, $R_5$ to $R_7$ are independently hydrogen, fluorine or —O—CO—CH=CH$_2$, and n is an integer from 1 to 5.

The compound (oligomer) represented by Formula 2 as the third additive is a flame retardant additive component and may improve the flame retardancy and impart the decreasing effects of battery resistance. Typical examples may include the following Formulae 2a and 2b.

[Formula 2a]

[Formula 2b]

Generally, a fluorine atom has strong electron withdrawing properties, and a compound including the fluorine atom and represented by the above Formula 2 is known to block continuous combustion reaction during the burning of an organic solvent by the elevation of the temperature of a device, or block the inflow of oxygen into the electrolyte, thereby restraining the burning any longer. That is, the compound represented by Formula 2 may be decomposed when the temperature of an electrochemical device increases to easily form radicals (X$^-$). In this case, the radicals (X$^-$) may capture radicals (OH$^-$, H$^+$) generated from the decomposition of the organic solvent and produce stable and incombustible HX, thereby restraining the continuous combustion of the organic solvent. Particularly, since a compound including a C—F bond as in the compound of the above Formula 2, has a quite strong bonding force and has very high structural safety, the flame retardancy of the gel polymer electrolyte may be further improved.

The amount of the compound represented by Formula 2, as the third additive may be from 0.5 to 20 parts by weight based on 100 parts by weight of the total amount of the gel polymer electrolyte, without limitation. In the case that the amount is less than 0.5 parts by weight, the flame retardant effects may be insufficient, and the mechanical properties of the electrolyte may be deteriorated. In the case that the amount exceeds 20 parts by weight, the ionic conductivity of the electrolyte may be decreased.

Meanwhile, in the gel polymer electrolyte of the present invention, non-aqueous organic solvents used for the preparation of a common electrolyte may be used, without limitation. Typical examples of the non-aqueous organic solvent may include a cyclic carbonate, a linear carbonate, a lactone, an ether, an ester, a sulfoxide, an acetonitrile, a lactam and a ketone.

The cyclic carbonate may include ethylene carbonate (EC), propylene carbonate (PC), butylene carbonate (BC), fluoroethylene carbonate (FEC), etc., and the linear carbonate may include diethyl carbonate (DEC), dimethyl carbonate (DMC), dipropyl carbonate (DPC), ethyl methyl carbonate (EMC), methyl propyl carbonate (MPC), etc. The lactone may include gamma butyrolactone (GBL), and the ether may include dibutyl ether, tetrahydrofuran, 2-methyl tetrahydrofuran, 1,4-dioxane, 1,2-dimethoxyethane, 1,2-diethoxyethane, etc. The ester may include methyl formate, ethyl formate, propyl formate, methyl acetate, ethyl acetate, propyl acetate, methyl propionate, ethyl propionate, butyl propionate, methyl pivalate, etc. In addition, the sulfoxide may include dimethylsulfoxide, etc., and the lactam may include N-methyl-2-pyrrolidone (NMP), etc. In addition, the ketone may include polymethyl vinyl ketone. In addition, a halogen derivative of the organic solvent may be used. These solvents may be used alone or as a mixture thereof.

Particularly, the organic solvent in the gel polymer electrolyte of the present invention may further include an organic solvent containing fluorine to maximize flame retardancy.

In addition, in the gel polymer electrolyte of the present invention, the electrolyte salt may be an electrolyte salt for a common electrochemical device, and may be a combination of (i) at least one cation selected from the group consisting of $Li^+$, $Na^+$ and $K^+$ and (ii) at least one anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, without limitation. These electrolyte salts may be used alone or as a mixture thereof. The amount of the electrolyte salt is not specifically limited. The electrolyte salt may particularly include a lithium salt or a lithium imide salt.

In addition, in the gel polymer electrolyte of the present invention, the first polymerizable monomer may be any polyfunctional acrylate compounds used for the preparation of a common gel polymer electrolyte, without limitation. Particularly, a phosphate compound or a pyrophosphate compound, known to be used as a flame retardant agent may be included. Typical example of the phosphate compound may include a phosphate acrylate monomer represented by the following Formula 4.

[Formula 4]

where $R_{30}$ to $R_{32}$ are independently hydrogen or an alkyl group having 1 to 3 carbon atoms, and q is an integer from 1 to 3.

Typical examples of the first polymerizable monomer may include a phosphate acrylate represented by the following Formula 4a.

[Formula 4a]

That is, the phosphate compound of the first polymerizable monomer may be oxidized by the burning when the temperature of a device increases to form a cross-linking compound having a three dimensional network structure. For example, the phosphate compound is thermally decomposed to form a phosphoric acid, and a dehydration reaction is carried out between the transformed phosphoric acid molecules to form a cross-linking bond. Thus, the electrolyte including the phosphate compound may block the inflow of oxygen into the electrolyte to restrain the burning of the organic solvent.

Since the first polymerizable monomer of the present invention includes a phosphate part, which is a flame retardant functional group and an acrylate group, a polymer matrix, which is a basic skeleton of the gel polymer electrolyte, may be formed through a polymerization reaction. Thus, flowing properties are not illustrated in the electrolyte, and the gel polymer electrolyte of the present invention may accomplish electrochemical safety and thermal safety, particularly, improving effects of flame retardancy.

The amount of the first polymerizable monomer may be from 0.5 to 20 parts by weight based on 100 parts by weight of the total amount of the gel polymer electrolyte, without limitation. In the case that the amount is less than 0.5 parts by weight, effects as a cross-linking agent is insufficient, the gellation of the polymer may be difficult, and the mechanical properties of the electrolyte may be deteriorated. In the case that the amount exceeds 20 parts by weight, the monomer may remain in the electrolyte, and battery performance, for example, ionic conductivity may decrease.

In addition, the gel polymer electrolyte of the present invention may further include a polymerization initiator.

The polymerization initiator may be included in an amount ratio of 0.01 to 5 parts by weight based on 100 parts by weight of the total amount of the polymerizable monomer. Non-limiting examples of the polymerization initiator may include an organic peroxide or hydroperoxide such as benzoyl peroxide, acetyl peroxide, dilauryl peroxide, di-tert-butylperoxide, t-butyl peroxy-2-ethyl-hexanoate, cumyl hydroperoxide, hydrogen peroxide, etc., and an azo compound such as 2,2-azobis(2-cyanobutane), 2,2-azobis(methylbutyronitrile), azobis(isobutyronitrile) (AIBN), azobisdimethyl-valeronitrile (AMVN), etc. The above-described polymerization initiator may be thermally decomposed to form radicals and may react with the polymerizable monomer by a free radical polymerization to form a gel polymer electrolyte.

In addition, the gelling method of the gel polymer electrolyte of the present invention is not specifically limited, and may be performed according to common methods known in this field.

Particularly, a gel type may be formed by i) adding a first polymerizable monomer and a first additive, and selectively at least one additive of second and third additives in an electrochemical device and performing a polymerization reaction in the presence of a polymerization initiator to form a polymer matrix, and then, gelling by impregnating the polymer matrix with an electrolyte including an electrolyte salt and an organic solvent; or ii) preparing a precursor solution of a gel polymer electrolyte including a first additive, selectively at least one additive of second and third additives, a polymerizable monomer, a polymerization initiator, an electrolyte salt and an organic solvent, and performing a polymerization reaction.

In this case, the polymerization reaction may be performed through a heating, e-beam, gamma ray and aging at room temperature/high temperature process. In the case that the polymerization reaction is a thermal polymerization, about 1 to 8 hours may be consumed, and the reaction temperature may be in a range of 50 to 100° C.

Meanwhile, a common polymerization reaction is inconvenient because is necessary to be performed in inert conditions so as to basically block the reaction of the radical with oxygen that is a radical scavenger in the air.

However, by providing a gel polymer electrolyte including a polymerizable monomer including a flame retardant functional group and a flame retardant additive imparting flame retardancy reinforcing performance in the present invention, the flame retardancy reinforcing effects of the gel polymer electrolyte may be imparted, and further, a polymerization reaction for preparing a gel polymer electrolyte in the presence of the air or oxygen may be performed. That is, the additive may decrease the influence of oxygen during performing the polymerization reaction, and the reactivity of the polymerizable monomers may be improved. In addition, the extent of reaction may be increased so that unreacted monomers are hardly present. As a result, defects such as the deterioration of charge and discharge performance induced by the remaining unreacted monomers in the battery, may be improved.

In addition, in an embodiment of the present invention, an electrochemical device including a cathode, an anode, a separator disposed between the cathode and the anode and the gel polymer electrolyte of the present invention is provided.

In this case, the electrochemical device includes all devices in which an electrochemical reaction is performed. Particularly, all kinds of primary batteries, secondary batteries, fuel cells, solar cells, capacitors, etc. may be included. The secondary battery may be a lithium secondary battery, and non-limiting examples of the lithium secondary battery may include a lithium metal secondary battery, a lithium ion secondary battery, a lithium polymer secondary battery or a lithium ion polymer secondary battery.

The electrochemical device of the present invention may be manufactured by a common method known in this field. According to a preferred embodiment, the electrochemical device may be manufactured by a method including (a) inserting an electrode assembly formed by wrapping a cathode, an anode and a separator disposed between the cathode and the anode in a case of an electrochemical device; and (b) inserting the precursor solution of a gel polymer electrolyte in the case and polymerizing to form a gel polymer electrolyte.

The electrode of the electrochemical device may be manufactured by a common method known in this field. For example, a slurry is prepared by mixing and stirring an electrode active material, a solvent, and a binder, a conductive material and a dispersing agent, as occasion demands, spreading (coating) the slurry on a current collector of a metal material, compressing and drying.

The electrode active material may use a cathode active material or an anode active material.

The cathode active material may include a lithium nickel manganese composite oxide (LNMO) and other materials, for example, a layer structured compound such as lithium cobalt oxide ($LiCoO_2$), lithium nickel oxide ($LiNiO_2$), etc.; a lithium transition metal composite oxide substituted with a transition metal such as $Li(Ni_aCo_bMn_c)O_2$ ($0<a<1$, $0<b<1$, $0<c<1$, $a+b+c=1$); a lithium manganese oxide such as $LiMnO_3$, $LiMn_2O_4$, $LiMnO_2$, etc.; a lithium copper oxide ($Li_2CuO_2$); a vanadium oxide such as $LiV_3O_8$, $V_2O_5$, $Cu_2V_2O_7$, etc.; $LiFe_3O_4$; a lithium phosphate such as $LiFePO_4$, $LiCoPO_4$, $LiFe_xMn_{1-x}PO_4$, etc.; a Ni site type lithium nickel oxide represented by a Formula of $LiNi_{1-x}MxO_2$ (where M=Co, Mn, Al, Cu, Fe, Mg, B or Ga, and x=0.01 to 0.3); a lithium manganese composite oxide represented by a Formula of $LiMn_{2-x}MxO_2$ (where M=Co, Ni, Fe, Cr, Zn or Ta, and x=0.01 to 0.1) or $Li_2Mn_3MO_8$ (where M=Fe, Co, Ni, Cu or Zn), etc., without limitation.

The anode active material may be a common anode active material used in an anode of a common electrochemical device, without specific limitation. Typical examples of the anode active material used may include a lithium titanium oxide (LTO), and other materials, for example, carbon such as hard carbon, graphite-based carbon, etc.; $Li_xFe_2O_2$ ($0 \le x \le 1$), $Li_xWO_2$ ($0 \le x \le 1$), a lithium metal; a lithium alloy; a silicon alloy; a tin alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene, etc.; a Li—Co—Ni-based material; titanium oxide, etc.

In addition, a metal oxide such as $TiO_2$, $SnO_2$, etc., that may intercalate and deintercalate lithium and has a potential less than 2 V with respect to lithium may be used, without limitation. Particularly, a carbon material such as graphite, a carbon fiber, active carbon, etc. may be preferably used.

The current collector of a metal material is a metal having high conductivity and a metal to which the slurry of the electrode active material may easily attach. Any metals may be used only when the metal has no reactivity in a voltage range of a battery. Non-limiting examples of a cathode collector may include aluminum, nickel, or a foil formed by the combination thereof, and non-limiting examples of an anode collector may include copper, gold, nickel, a copper alloy or a foil formed by the combination thereof.

The separator is not specifically limited, however, a porous separator may preferably be used. Non-limiting examples of the separator may include polypropylene, polyethylene or polyolefin-based porous separator. In addition, methods for applying the separator in a battery may include a common winding method, a lamination (stacking) method or a folding method of a separator and an electrode, etc.

The appearance of the electrochemical device of the present invention is not limited, and may have a cylindrical type using a can, a prismatic type, a pouch type or a coin type, etc.

MODE FOR CARRYING OUT THE INVENTION

Hereinafter, the present invention will be described in more detail referring to embodiments and comparative embodiments. However, the following embodiments are for illustrating the present invention, and the scope of the present invention is not limited to the embodiments set forth herein.

EXAMPLES

Example 1

In an organic solvent having a weight ratio of EC:PC:EMC=1:1:1, $LiPF_6$ was dissolved in the air so that the concentration thereof was 1 M. Then, 5 parts by weight of the phosphate acrylate of the above Formula 4a as a first polymerizable monomer, 0.25 parts by weight of AIBN as a polymerization initiator, and 3 parts by weight of TTFEP as a first additive based on 100 parts by weight of a gel polymer electrolyte were added thereto to prepare a precursor solution of the gel polymer electrolyte.

Example 2

In an organic solvent having a weight ratio of EC:PC:EMC=1:1:1, $LiPF_6$ was dissolved in the air so that the concentration thereof was 1 M. Then, 3 parts by weight of the phosphate acrylate of the above Formula 4a as a polymerizable monomer, 0.25 parts by weight of AIBN as a polymerization initiator, 3 parts by weight of TTFEP as a first additive and 2 parts by weight of ethoxylated trimethylolpropane triacrylate as a second additive based on 100 parts by weight of a gel polymer electrolyte were added thereto to prepare a precursor solution of the gel polymer electrolyte.

Example 3

In an organic solvent having a weight ratio of EC:PC:EMC=1:1:1, $LiPF_6$ was dissolved in the air so that the concentration thereof was 1 M. Then, 2 parts by weight of the phosphate acrylate of the above Formula 4a as a polymerizable monomer, 0.25 parts by weight of AIBN as a polymerization initiator, 3 parts by weight of TTFEP as a first additive, 2 parts by weight of ethoxylated trimethylolpropane triacrylate as a second additive, and 2 parts by weight of a compound having the above Formula 2a as a third additive based on 100 parts by weight of a gel polymer electrolyte were added thereto to prepare a precursor solution of the gel polymer electrolyte.

Comparative Example 1

A precursor solution of a gel polymer electrolyte was prepared by performing the same procedure described in Example 2 except for adding 5 parts by weight of the ethoxylated trimethylolpropane triacrylate as the second additive while excluding the first additive.

Figure 1:
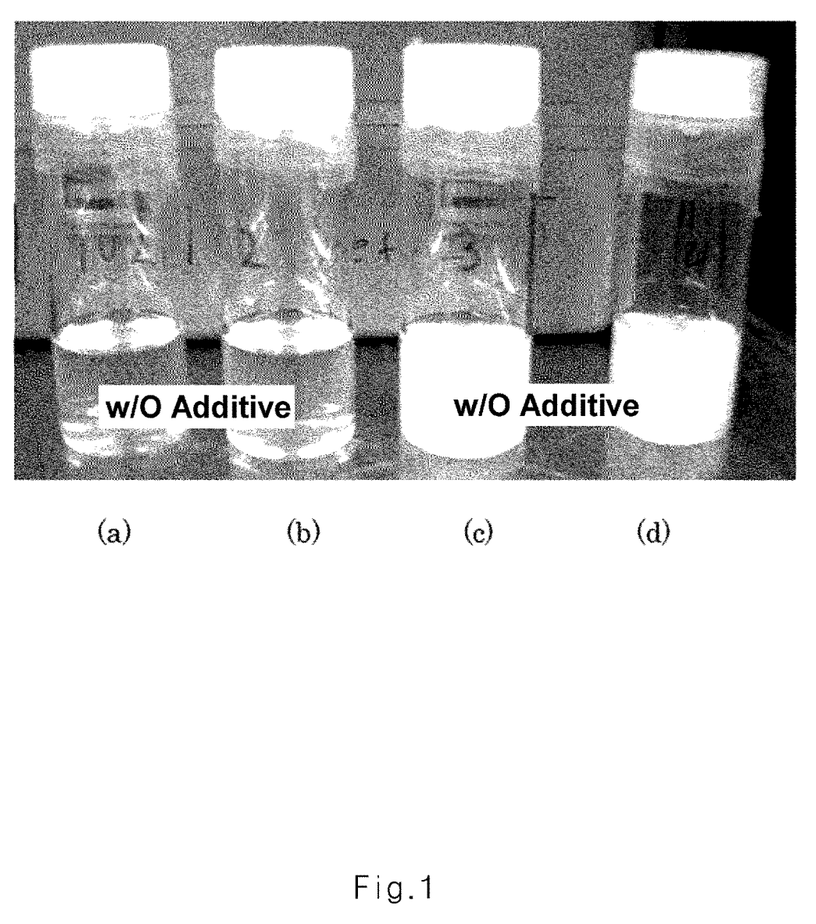
FIG. 1 is a photographic image illustrating the experiments on forming reaction of a gel polymer electrolyte according to Experimental Example 1 of the present invention.

Experimental Example 1: Experiment on the Formation of Gel Polymer Electrolyte The precursor solution of the gel polymer electrolyte of Example 1 (c), the precursor solution of the gel polymer electrolyte of Example 2 (d), and the precursor solutions of the gel polymer electrolytes of Comparative Example 1 (a and b) prepared in a glove box were put in vials, respectively, in a dry room. Oxygen was inserted in the vial and mixed. Then, a polymerization reaction was performed in a chamber at 50 to 80° C., and the formation of gel (the amount of free liquid) was observed with naked eyes. From the results, the formation of the gel was easy in the precursor solutions of the gel polymer electrolytes of Examples 1 and 2 of the present invention when compared to precursor solution of the gel polymer electrolyte of Comparative Example 1 even with the oxygen (see FIG. 1).

Experimental Example 2: Experiment on Flame Retardancy of Gel Polymer Electrolyte After forming gel using a precursor solution of the gel polymer electrolyte prepared in Examples 1 to 3 and Comparative Example 1, the gel was fired and time until the gel burns completely (combustion time) and self-extinguishing time were measured. The results are illustrated in the following Table 1.

TABLE 1

|  | Initial weight | Combustion time | Self-extinguishing time (SET) |
|---|---|---|---|
| Example 1 | 4.7 g | 190 sec | 40.4 sec/g |
| Example 2 | 4.9 g | 200 sec | 40.8 sec/g |
| Example 3 | 4.5 g | 400 sec | 89.0 sec/g |
| Comparative Example 1 | 4.6 g | 130 sec | 28.3 sec/g |

From the results of the experiments, it would be secured that the combustion time and the self-extinguishing time of the gels according to Examples 1 to 3 including an additive containing a flame retardant functional group, etc. according to the present invention were markedly long when compared to those of the gel according to Comparative Example 1. Therefore, the gel polymer electrolyte of the present invention is able to secure the safety and the flame retardancy.

Experimental Example 3: Experiment on Cycle Life Properties

An electrode assembly was formed by disposing a separator of a polyethylene material between a cathode including a LCO and an anode including graphite according to a common method, and the precursor solutions of the gel polymer electrolytes of Example 3 and Comparative Example 1 and a common liquid electrolyte were injected, respectively. After performing reaction at 70° C. for 5 hours, lithium secondary batteries were manufactured. Then, charging and discharging were performed at 0.5 C for 50 times to measure the cycle life properties of secondary batteries.

Figure 2:
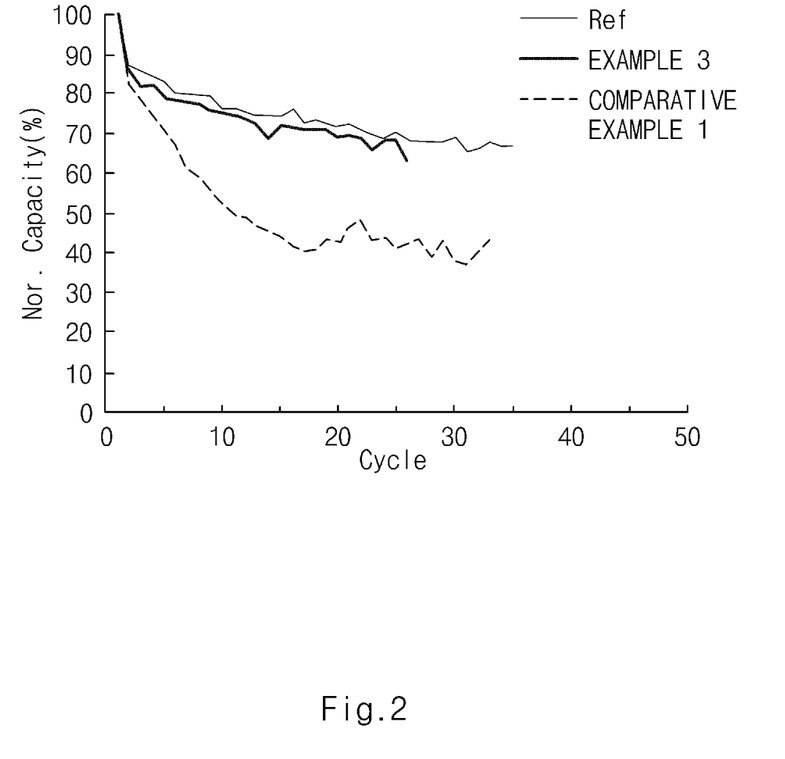
FIG. 2 is a graph illustrating cell life properties according to Experimental Example 2 of the present invention.

As shown in FIG. 2, the secondary battery using the gel polymer electrolyte of Example 3 of the present invention has improved cycle life properties when compared to a battery using the gel polymer electrolyte of Comparative Example 1 and has similar cycle properties to that of a battery using the liquid electrolyte.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. A gel polymer electrolyte obtained by polymerizing and gelling a composition for a gel polymer, comprising:
   organic solvents, wherein the organic solvents are the only organic solvents in the gel polymer electrolyte, the organic solvents consisting of two or more selected from a cyclic carbonate, a linear carbonate, a lactone, an ether, a sulfoxide, an acetonitrile, a lactam, and a ketone,
   an electrolyte salt,
   a first polymerizable monomer represented by the following Formula 4, and
   a compound represented by the following Formula 1 as a first additive:

[Formula 1]

[Formula 4]

where $R_1$ to $R_3$ are independently hydrogen, an alkyl group having 1 to 5 carbon atoms, an aryl group having 5 to 7 carbon atoms, or a fluorine substituted alkyl group having 1 to 5 carbon atoms, or at least two substituents selected from $R_1$ to $R_3$ are coupled or connected to each other to form a cycle group having a ring atom composed of 2 to 6 carbon atoms or a heterocyclic group having a ring atom composed of 2 to 8 carbon atoms and 1 to 3 oxygen hetero atoms, and wherein $R_{30}$ to $R_{32}$ are independently hydrogen or an alkyl group having 1 to 3 carbon atoms, and q is an integer from 1 to 3.

2. The gel polymer electrolyte of claim 1, wherein the first additive comprises at least one selected from the group consisting of trimethyl phosphite, triethyl phosphite, tributyl phosphite, triphenyl phosphite, ethyl ethylene phosphite and tris(2,2,2-trifluoroethyl)phosphite.

3. The gel polymer electrolyte of claim 1, wherein an amount of the first additive is 0.01 to 10 parts by weight based on 100 parts by weight of a total amount of the gel polymer electrolyte.

4. The gel polymer electrolyte of claim 1, further comprising a (meth)acrylic acid ester compound containing at least two acrylate groups in a molecule, as a second additive.

5. The gel polymer electrolyte of claim 4, wherein the second additive is at least one selected from the group consisting of compounds represented by the following Formulae 3a to 3c:

[Formula 3a]

where $R_8$, $R_9$, $R_{10}$ and $R_{13}$ are independently hydrogen, a substituted or unsubstituted alkyl group having 1 to 4 carbon atoms, $R_{11}$ and $R_{12}$ are independently hydrogen, oxygen or an alkyl group having 1 to 4 carbon atoms, where in the case that $R_{11}$ and $R_{12}$ are oxygen, a double bond is formed with a combined carbon, m is an integer from 1 to 20, and o is an integer of 0 or 1 to 3,

[Formula 3b]

where $R_{14}$ is an alkyl group having 1 to 5 carbon atoms, or where $R_{18}$ is an alkylene group having 1 to 5 carbon atoms, $R_{19}$ is an alkyl group having 1 to 5 carbon atoms, an alkyl group including a hydroxyl terminal group and having 1 to 5 carbon atoms, or —C—O—CO—CH=CH$_2$, and $R_{20}$ and $R_{21}$ are —R$_{22}$—O—CO—CH=CH$_2$, where $R_{22}$ is an alkylene group having 1 to 5 carbon atoms, $R_{15}$ and $R_{16}$ are an alkylene group having 1 to 10 carbon atoms or an alkylene group including at least one ether group and having 1 to 10 carbon atoms, $R_{17}$ is —C—O—(R$_{24}$)$_y$—O—CO—CH=CH$_2$ or —(R$_{24}$)$_y$—O—CO—CH=CH$_2$, where $R_{24}$ is an alkylene group having 1 to 5 carbon atoms, y is an integer from 0 to 5, and P is an integer from 0 to 5,

[Formula 3c]

where $R_{25}$ is an alkyl group having 1 to 5 carbon atoms, $R_{26}$ and $R_{27}$ are —O—(R$_{23}$)$_y$—O—CO—CH=CH$_2$ or —(R$_{26}$)$_y$—O—CO—CH=CH$_2$, where $R_{23}$ and $R_{26}$ are an alkylene group having 1 to 5 carbon atoms, and y is an integer from 0 to 5.

6. The gel polymer electrolyte of claim 4, wherein the second additive is a single material or a mixture of at least two selected from the group consisting of ethoxylated trimethylolpropane triacrylate, di(trimethylolpropane)tetraacrylate, diethylene glycol diacrylate, diethylene glycol dimethacrylate, ethylene glycol dimethacrylate, dipropylene glycol diacrylate, dipropylene glycol dimethacrylate, ethylene glycol divinyl ether, diethylene glycol divinyl ether, triethylene glycol dimethacrylate, dipentaerythritol pentaacrylate, teimethylolpropane triacrylate, trimethylolpropane trimethacrylate, propoxylated(3) trimethylolpropane triacrylate, propoxylated(6) trimethylolpropane triacrylate, polyethylene glycol diacrylate and polyethylene glycol dimethacrylate.

7. The gel polymer electrolyte of claim 4, wherein the second additive is comprised in an amount ratio of 0.1 to 20 parts by weight based on 100 parts by weight of a total amount of the gel polymer electrolyte.

8. The gel polymer electrolyte of claim 1, further comprising a compound represented by the following Formula 2, as a third additive:

[Formula 2]

where $R_4$ is hydrogen or an alkyl group having 1 to 5 carbon atoms, $R_5$ to $R_7$ are independently hydrogen, fluorine or —O—CO—CH=CH$_2$, and n is an integer from 1 to 5.

9. The gel polymer electrolyte of claim 8, wherein the third additive is represented by the following Formula 2a or 2b:

[Formula 2a]

[Formula 2b]

10. The gel polymer electrolyte of claim 8, wherein an amount of the third additive is 0.5 to 20 parts by weight based on 100 parts by weight of a total amount of the gel polymer electrolyte.

11. The gel polymer electrolyte of claim 1, wherein the electrolyte salt comprises a combination of (i) at least one cation selected from the group consisting of Li$^+$, Na$^+$ and K$^+$ and (ii) at least one anion selected from the group consisting of PF$_6^-$, BF$_4^-$, Cl$^-$, Br$^-$, I$^-$, ClO$_4^-$, AsF$_6^-$, CH$_3$CO$_2^-$, CF$_3$SO$_3^-$, N(CF$_3$SO$_2$)$_2^-$ and C(CF$_2$SO$_2$)$_3^-$.

12. The gel polymer electrolyte of claim 1, wherein the first polymerizable monomer is represented by the following Formula 4a:

[Formula 4a]

13. The gel polymer electrolyte of claim 1, wherein the first polymerizable monomer is comprised in an amount ratio of 0.5 to 20 parts by weight based on 100 parts by weight of a total amount of the gel polymer electrolyte.

14. The gel polymer electrolyte of claim 1, wherein the composition for a gel polymer electrolyte further comprises a polymerization initiator.

15. The gel polymer electrolyte of claim 14, wherein the polymerization initiator is comprised in an amount ratio of 0.01 to 5 parts by weight based on 100 parts by weight of a total amount of a polymerizable monomer.

16. The gel polymer electrolyte of claim 14, wherein the polymerization initiator is selected from the group consisting of benzoyl peroxide, acetyl peroxide, dilauryl peroxide, di-tert-butylperoxide, t-butyl peroxy-2-ethyl-hexanoate, cumyl hydroperoxide, hydrogen peroxide, 2,2-azobis(2-cyanobutane), 2,2-azobis(methylbutyronitrile), azobis(isobutyronitrile) and azobisdimethyl-valeronitrile.

17. An electrochemical device comprising:
a cathode, an anode, a separator disposed between the cathode and the anode, and the gel polymer electrolyte described in claim 1.

18. The electrochemical device of claim 17, wherein the electrochemical device is a lithium secondary battery.

19. The gel polymer electrolyte of claim 1, wherein the first additive comprises at least one selected from the group consisting of triphenyl phosphite, ethyl ethylene phosphite and tris(2,2,2-trifluoroethyl)phosphite.

20. The gel polymer electrolyte of claim 1, wherein the organic solvents consist of the cyclic carbonate and the linear carbonate.

* * * * *